United States Patent [19]

Schneider

[11] 3,830,666

[45] Aug. 20, 1974

[54] INSULATION APPLICATION

[75] Inventor: Frank H. Schneider, Los Angeles, Calif.

[73] Assignee: The United States of America as represented by the Secretary of the Army, Washington, D.C.

[22] Filed: June 12, 1973

[21] Appl. No.: 369,321

[52] U.S. Cl............ 156/84, 102/105, 117/126 GB, 117/126 GE, 117/126 GF, 156/22, 156/64, 156/90, 156/289, 156/330, 156/335, 244/1 SC, 244/117 A
[51] Int. Cl............................................ B32b 31/26
[58] Field of Search......... 156/90, 22, 330, 335, 64, 156/289, 84; 117/126 GB, 126 GE, 126 GF; 244/1 SC, 117 A; 102/105

[56] References Cited
UNITED STATES PATENTS
3,603,260   9/1971   Johnson.............................. 102/105
3,616,140   10/1971   Copeland........................ 102/105 X Primary Examiner—Edward G. Whitby
Attorney, Agent, or Firm—Lawrence A. Neureither; Leonard Flank; Jack W. Voigt

[57] ABSTRACT

Disclosed is a method for applying and curing thermo insulation to an aluminum substructure, and particularly, to an elliptical cone shaped aluminum substructure. The method comprises curing and bonding a thin covering of insulation to the aluminum substructure by a one step curing procedure. The insulation thickness is in the range of about 0.0600 inches. The insulation which is comprised of epoxy-phenolic film adhesive and silica fabric-phenolic resin is cured under a predetermined amount of heat and pressure for a predetermined amount of time to yield a cured and bonded insulation capable of withstanding extreme temperature and aerodynamic shear environment.

6 Claims, No Drawings

INSULATION APPLICATION

BACKGROUND OF THE INVENTION

Space vehicles and rockets are subjected to extreme temperature and aerodynamic forces when traveling at high speeds through the atmosphere. To protect the components within the vehicles or rockets, insulation and other means for providing cooling have been provided. Ablative heat shields and coverings have been used. Ablative coverings which have included glassy materials in combination with organic materials have been used to provide a cooling effect to the substrate material which is the skin or outer enclosure for the space vehicle or rocket. The cooling effect is partially attributed to the boiling away of organic materials which results in charring to produce carbon, and subsequently, gaseous and particulate matter which remove heat from the substrate material as ablation takes place. Further cooling may be attributed to absorption of additional heat by the gaseous and particulate matter which flow outwardly from the space vehicle or rocket which is being subjected to extreme temperature and aerodynamic forces.

The insulating of thin elliptical cone shaped aluminum substructures has been accomplished by prior art methods which have involved complex elliptical machining, additional post bonding cure cycle, and handling of a pre-fabricated insulation sleeve.

An object of this invention is to provide a one step procedure, i.e. a method whereby curing and bonding of insulation to an elliptical aluminum substructure is accomplished without having to perform additional elliptical machining and additional post bond curing. The one step procedure obviates the need to handle a pre-fabricated insulation sleeve.

SUMMARY OF THE INVENTION

A film adhesive is applied to an aluminum substructure, followed by one layer of insulation material comprised of phenolic resin impregnated silica fabric. A bleeder assembly comprised of a perforated release material, a perforated shrink tape, glass cloth, and a complete wrap of perforated shrink tape is placed over the underlying adhesive and insulation material. The bleeder assembly functions as a means for holding the underlying adhesive and insulation material in place while curing, and includes means for allowing liquids and volatiles to escape from the underlying adhesive and insulation material while curing. The aluminum substructure, covered with adhesive, insulation, and bleeder assembly, is placed in a vacuum bag. The vacuum bag is evacuated to a predetermined pressure. The vacuum bag with contents is placed in an autoclave which is purged and pressurized with an inert gas (nitrogen) to a predetermined pressure. Heat is then applied to maintain a predetermined heating rate and temperature while the insulation is cured for a predetermined period of time. Pressure is maintained in the autoclave while maintaining a vacuum on the assembly during the cure cycle. After curing for a predetermined period of time the bonded and insulated part is cooled under pressure at a predetermined cooling rate until a predetermined temperature is reached. The vacuum on the vacuum-bagged covered aluminum structure and the pressure in the autoclave are released before removing the insulated part from the autoclave.

DESCRIPTION OF THE PREFERRED EMBODIMENT

The aluminum substructure to be insulated is given an initial surface cleaning by etching in a solution of sulfuric acid-sodium dichromate for 20 minutes at 66°C (150°F) per the standard procedure used in the art.

After etching, the aluminum surfaces are washed two or more times with an alkyl ketone (e.g. methyl ethyl ketone) and then air-dried for 30 minutes. The surfaces are then coated with epoxy-phenolic primer. The primer is air-dried for 30 minutes at ambient temperature followed by a one hour exposure at 82°C (180°F) in an oven.

The primed aluminum structure is covered in the following manner and sequences with:

a. One ply of 0.08 lb/ft$^2$ epoxy-phenolic film adhesive;

b. One ply of silica fabric-phenolic resin material;

c. One ply of perforated polytetrafluoroethylene (release material);

d. One complete wrap of perforated shrink tape (serves to prevent wrinkling of epoxy-phenolic film adhesive and silica fabric-phenolic resin during curing operation);

e. Eight plies of glass cloth for bleeder;

f. One complete wrap of perforated shrink tape; and g. Vacuum bag

The insulated aluminum substructure is vacuum-bagged and placed in an autoclave at ambient temperature. The autoclave is purged and then pressurized with nitrogen to 50 psig while maintaining vacuum on the assembly. The vacuum-bagged insulated aluminum structure is then cured at 149°C (300°F) for 3 hours while the pressure is maintained in the autoclave and vacuum is maintained on the aluminum structure within the vacuum bag. The vacuum-bagged, cured, insulated aluminum structure is cooled to 66°C (150°F) under vacuum while maintaining an autoclave pressure of about 50 psig with nitrogen gas.

The above described procedure yields a product free from voids or unbonded areas and wrinkles in the epoxy-phenolic film adhesive and silica fabric-phenolic resin material. A nondestructive testing of the product for voids in the adhesive bond line may be accomplished by passing ultrasonic waves from a transmitting transducer through the bonded product for detection by a receiving transducer. Changes in the strength in the received signal are attributed to changes in the attenuation due to the presence of defects in the adhesively bonded product. The entire product is immersed in water during testing. The water serves as a coupling medium during testing. A record of the testing may be made by recording the signals above a certain pre-set level. Thus, the regions which show the greatest attenuation because of voids appear as light areas in the record. This type of record is called a C-scan map. A typical C-scan map of a product revealing voids distinctly shows light areas where air was purposely trapped between the aluminum and the tape. A typical C-scan map of an adhesively bonded product without voids shows a series of lines, one for each pass of the transducers. Each pass of the transducers is made in a back and forth direction which is parallel to the axis of the product being tested.

The method of this invention includes means for releasing liquids and volatiles from the underlying adhesive and insulation material during the curing cycle and means for maintaining uniform pressure on the underlying adhesive and insulation material during the curing cycle. The perforated release material permits the escape of liquids and volatiles. The shrink tape helps to achieve uniform pressure to the underlying adhesive and insulation material as the curing proceeds with liquids and volatiles being expelled therefrom.

The plies of glass cloth (for bleeder) functions to soak up liquid expelled during the curing cycle.

The cured silica fabric-phenolic resin material is comprised substantially of phenolic resin-solids of about 28–30 weight percent and silicon dioxide content of about 68–70 weight percent. About 9–10 weight percent resin flow and about 5–6 weight percent volatiles are expelled during the curing cycle. Thus, the material before curing contains about 54–58 weight percent silica fabric that is impregnated with about 42–46 weight percent uncured phenolic resin.

The other materials used in the method of this invention are further identified below in terms used in the art along with additional descriptive information which is helpful in selection of materials. A glass cloth treated with methacrylatochromic chloride (a Werner-type chromium complex) promotes bonding for glass fibers. Such a glass cloth is referred to in the art as glass cloth, Volan-finish. Volan is a trademark of E. I. du Pont de Nemours & Co. for a Werner type chromium complex in isopropanol which is used as a bonding agent for glass fibers, paper, wood, and polymeric coatings. The shrinkable polyester tape, extruded sealant vacuum bag, release fabric (pink), high-temperature masking tape, epoxy-phenolic film adhesive, silica fabric-phenolic resin material, perforated polytetrafluoroethylene release material, adhesive primer, and other miscellaneous materials are commercially available under the material name or similar material name listed.

The method of this invention can be used for insulating aluminum substrate material of many irregular shapes having wide variations in sizes. For example, pitch fins or yaw fins for supersonic flight vehicles can be insulated while being held by a bonding fixture or bonding tool. The general procedure for insulating pitch fins and yaw fins is set forth under Examples I and II below.

EXAMPLE I

Insulating a Pitch Fin of a Flight Vehicle

1. Assemble the fin on the bonding tool that is adapted for receiving a fin of a flight vehicle. Seal the juncture of the fin and the tool with a sealant (room temperature vulcanizing rubber commonly used in sealing, caulking or similar procedures).

2. Check for and seal all leaks. The determination of leaks may be accomplished by applying two layers of glass cloth, covering with a sealed vacuum bag, and drawing a vacuum on the structure. With the structure under vacuum and the vacuum pump disconnected, a loss of less than 5 percent vacuum over a five minute period constitutes a sufficient seal. Seal leaks in the skin seam from the inside of the fin using sealant.

3. Apply 2 inch wide polytetrafluoroethylene tape to the tool next to the joint and to the base of the fin adjacent to the area filled with sealant.

4. Clean the exposed surface of the fin by wiping with methyl ethyl ketone.

5. Grit blast the cleaned surface.

NOTE: Handle cleaned and grit blasted surfaces only with clean cotton gloves.

6. Apply and dry the adhesive primer to the grit blasted surface of the fin.

7. Remove the separator film from one side of the adhesive film and apply the exposed surface of the adhesive film to the primed surface of the fin making butt joints and allowing approximately 1 inch of adhesive to extend beyond the primed surface onto the tool at the aft end of the fin and to the edge of the polytetrafluoroethylene tape at the base of the fin.

8. Heat tack the adhesive film in place using a heating iron over a polytetrafluoroethylene separator sheet. At no time shall the adhesive film be exposed to more than 210°F for more than 60 seconds.

9. Remove the separator film from the surface of the adhesive film.

10. Tailor the high silica fabric phenolic to the indented area along the leading edge of the fin and heat tack in place.

11. Cut a piece of high silica fabric 50 inches long from the roll and using a straight-edge, trim one-half inch of material off of the sides to produce a straight square edge.

12. Center the high silica fabric longitudinally, with the warp face up, over the leading edge of the fin, smooth tightly onto the adhesive film and trim the edges of the high silica fabric to the edge of the adhesive film.

13. Heat tack the high silica fabric in place.

14. Cover the remaining exposed adhesive film with tailored pieces of high silica fabric oriented the same as the previously applied fabric making a minimum gap butt joint without a selvage edge, heat tack in place, and trim to the edge of the adhesive film.

15. Embed thermocouples under the excess high silica fabric around the edge as necessary to monitor the bond line temperature.

16. Apply one layer of release fabric wrinkle-free and without seams over the high silica fabric and hold it in place with high temperature masking tape.

17. Apply six layers of glass cloth wrinkle-free and with no seams over the high silica fabric area but with the edges extending beyond the high silica fabric by approximately 4 inches. Stretch the cloth tight and hold in place with high temperature masking tape.

18. Cover the assembly with a plastic vacuum bag and seal to the tool with extruded vacuum bag sealant.

19. Attach vacuum hose fittings and vacuum gauge fittings to the vacuum bag in a manner to insure direct contact with the bleeder cloth extending beyond the high silica fabric.

20. Apply a vacuum of 2 to 6 inches of mercury, smoothing the bag and the bleeder material over the assembly. After the vacuum bag has been smoothed over the assembly, apply full vacuum pressure (20 inches of mercury minimum) and check for and seal all leaks in preparation for the cure cycle.

The cure cycle is described below under the heading cure cycle and is substantially the same as previously described except additional control limits are set forth.

CURE CYCLE

1. Place the vacuum bagged part in the autoclave.
2. Connect the thermocouple leads, draw a full vacuum (20 inches of mercury minimum) and check for and seal all leaks.
3. Pressurize the autoclave to 50 ± 5 psi maintaining full vacuum on the assembly.
4. Raise the bond line temperature to 290° ± 10°F in a minimum time of 30 minutes and maintain at 290° ± 10°F for 3 hours ± 15 minutes.
5. Cool the bonded part under pressure to 100°F at a rate of 5°F per 30 minutes before removing from the autoclave.

After removing the cured insulated vacuum-bagged part from the autoclave, remove the vacuum bag, bleeder cloth and masking tape from the part. The part is then rough trimmed by removing the excess high silica fabric on the aft end of the part. The part is then removed from the tool, and machining, as required, of the high silica fabric is accomplished to the dimensions required.

EXAMPLE II

Insulating a Yaw Fin of a Flight Vehicle

1–6. Follow same procedure as steps 1–6 of Example I.

7. Remove the separator film from one side of the adhesive film, and apply the exposed surface of the adhesive film to the primed surface of the fin allowing the adhesive film to extend onto the Teflon tape approximately 1 inch at the aft end and 0.19 inches along the base of the fin.
8. Heat tack the adhesive film in place using a heating iron over a polytetrafluoroethylene separation sheet. At no time shall the adhesive film be exposed to more than 210°F for more than 60 seconds.
9. Remove the separator film from the surface of the adhesive film.
10. Locate the high silica fabric on the adhesive. Heat tack in place if necessary.
  NOTE: Position the longitudinal or warp direction of the material on the centerline of the structure with the warp face up.
11. Embed thermocouples under the excess high silica fabric around the edge as necessary to monitor the bond line temperature.
12. Apply one layer of release fabric wrinkle-free and without seams over the high silica fabric and hold it in place with high temperature masking tape.
13. Apply six layers of glass cloth wrinkle-free and with no seams over the high silica fabric area but with the edges extending beyond the high silica fabric by approximately 4 inches. Stretch the cloth tight and hold in place with high temperature masking tape.
14. Cover the assembly with a plastic vacuum bag and seal to the tool with extruded vacuum bag sealant.
15. Attach vacuum hose fittings and vacuum gauge fittings to the vacuum bag in a manner to insure direct contact with the bleeder cloth extending beyond the high silica fabric.
16. Apply a vacuum of 2 to 6 inches of mercury, smoothing the bag and the bleeder material over the assembly. After the vacuum bag has been smoothed over the assembly, apply full vacuum pressure (20 inches of mercury minimum) and check for and seal all leaks in preparation for the cure cycle.

The cure cycle procedure used for EXAMPLE I is also used for EXAMPLE II.

I claim:

1. A method for applying and curing thermo insulation to a prepared surface of an aluminum substructure that has been prepared by being given a preliminary mechanical and chemical cleaning of the surface to be insulated, followed by a washing with an alkyl ketone solvent and a subsequent drying, said method comprising:

A. applying film adhesive and uncured insulation to a prepared surface of said aluminum substructure which comprises:
  a. priming said aluminum surface to be insulated with an epoxy-phenolic primer, air drying said primer followed by a predetermined temperature exposure;
  b. covering said primed surface with one ply of an epoxy-phenolic film adhesive; and,
  c. applying one ply of silica fabric-phenolic resin material over said film adhesive;
B. forming a bleeder assembly over said phenolic resin material which comprises:
  a. applying one ply of perforated polytetrafluoroethylene over said silica fabric-phenolic resin material;
  b. applying a first one complete wrap of perforated shrink tape over said perforated polytetrafluoroethylene, said first one complete wrap of shrink tape serving the function of maintaining uniform pressure on and preventing the wrinkling of said epoxy-phenolic film adhesive and silica fabric-phenolic resin material during a subsequent cure cycle;
  c. applying a plurality of plies of glass cloth over said shrink tape, said glass cloth serving as bleeder; and
  d. applying a second one complete wrap of perforated shrink tape over said glass cloth, said second one complete wrap of shrink tape serving the function of said first one complete wrap of perforated shrink tape plus serving the additional function of retaining said bleeder in place;
C. preparing the aluminum substructure that is covered with the uncured insulation and the bleeder assembly for a cure cycle, said preparing comprising:
  a. covering said covered aluminum substructure with a vacuum bag provided with vacuum hose fittings and vacuum gauge fittings;
  b. applying a first partial vacuum to the vacuum bag to allow a smoothing of the bag and the bleeder assembly over said aluminum substructure; and
  c. applying a second partial vacuum, said second partial vacuum being higher than first partial vacuum, and checking for and sealing all leaks in preparation for a cure cycle;
D. completing a cure cycle which comprises:
  a. placing the vacuum-bagged covered aluminum substructure in an autoclave at ambient temperature and drawing a partial vacuum on said vacuum bag and contents;

b. purging and pressurizing the autoclave with an inert gas to a predetermined pressure while maintaining said vacuum;
c. raising temperature in autoclave to a predetermined temperature in a predetermined minimum amount of time and maintaining said predetermined temperature to cure said thermo insulation on said aluminum substructure for a predetermined period of time;
d. cooling the vacuum-bagged covered aluminum substructure under vacuum while maintaining pressure in autoclave, said cooling completed at a predetermined cooling rate per time interval to a predetermined temperature value; and thereafter,
e. releasing said vacuum and said pressure and subsequently removing said vacuum-bagged covered aluminum substructure from the autoclave.

2. The method as set forth in claim 1 wherein the inert gas employed for purging and pressurizing during said cure cycle is nitrogen gas; predetermined pressure for said cure cycle is about 50 ± 5 psi; said predetermined temperature for said cure cycle is 290°F ± 10°F which is reached in a predetermined minimum time of about 30 minutes, said predetermined temperature being maintained for said predetermined period of time of about 3 hours ± 15 minutes; and said cooling under pressure is accomplished to a predetermined temperature value of about 100°F with the predetermined cooling rate being about 5°F per about 30 minutes time interval.

3. The method as set forth in claim 1 wherein said alkyl ketone solvent is methyl ethyl ketone and wherein said primer is air dried at ambient temperature for about 30 minutes followed by an exposure for a predetermined period of time of about 1 hour and at a predetermined temperature exposure of about 180°F.

4. The method as set forth in claim 1 wherein said first partial vacuum is in the range of about 2 to 6 inches of mercury.

5. The method as set forth in claim 1 wherein said second partial vacuum is amout 20 inches of mercury minimum.

6. The method as set forth in claim 1 wherein said partial vacuum drawn on said vacuum bag and contents is a partial vacuum of at least about 20 inches of mercury.

* * * * *